United States Patent
Jansen et al.

(10) Patent No.: US 11,427,459 B2
(45) Date of Patent: Aug. 30, 2022

(54) REFRIGERATOR APPLIANCE WITH TIMED PREHEATING FOR DISPENSED FLUIDS

(71) Applicant: Haier US Appliance Solutions, Inc., Wilmington, DE (US)

(72) Inventors: Katherine Michelle Jansen, Louisville, KY (US); Ryan Joseph Thomas, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 479 days.

(21) Appl. No.: 16/526,137

(22) Filed: Jul. 30, 2019

(65) Prior Publication Data

US 2021/0032089 A1 Feb. 4, 2021

(51) Int. Cl.
| | |
|---|---|
| *B67D 1/00* | (2006.01) |
| *B67D 1/08* | (2006.01) |
| *F25D 23/12* | (2006.01) |
| *F25C 5/20* | (2018.01) |
| *F25D 23/02* | (2006.01) |
| *A47J 31/40* | (2006.01) |

(52) U.S. Cl.
CPC .......... *B67D 1/0895* (2013.01); *A47J 31/407* (2013.01); *F25C 5/22* (2018.01); *F25D 23/028* (2013.01); *F25D 23/126* (2013.01); *F25D 2400/02* (2013.01)

(58) Field of Classification Search
CPC .......................... A47J 31/407; F25D 2400/02; F25D 2700/06; B67D 1/0895
See application file for complete search history.

(56) References Cited

U.S. PATENT DOCUMENTS

| | | | |
|---|---|---|---|
| 8,935,935 B2 | 1/2015 | Waugh et al. | |
| 2014/0270725 A1* | 9/2014 | Bertolini | F25D 23/04 392/341 |
| 2015/0083384 A1 | 3/2015 | Lewis, Jr. et al. | |
| 2017/0245675 A1* | 8/2017 | Junge | B65D 85/8043 |
| 2017/0336133 A1* | 11/2017 | King | F25D 23/12 |
| 2018/0008087 A1 | 1/2018 | Miller et al. | |
| 2018/0042258 A1* | 2/2018 | Roberts | A47J 31/0615 |
| 2020/0121122 A1* | 4/2020 | Zuo | A47J 31/469 |

FOREIGN PATENT DOCUMENTS

| | | |
|---|---|---|
| CN | 201892841 U | 7/2011 |
| KR | 745717 B1 | 7/2007 |

* cited by examiner

*Primary Examiner* — Filip Zec
(74) *Attorney, Agent, or Firm* — Dority & Manning, P.A.

(57) ABSTRACT

A refrigerator appliance, as provided herein, may include a cabinet, a door, a dispensing assembly, a heating element, and a controller. The controller may be configured to initiate a dispensing operation. The dispensing operation may include providing a first time, TIME-1, by which a fluid is to be ready at a first temperature, TEMP-1, within the cabinet; ascertaining a first time period, Δt1, required to heat the fluid to at least the first temperature, TEMP-1; initiating detection of a container within a dispenser recess prior to the first time, TIME-1; and directing a heating element prior to the first time, TIME-1, based on initiating detection of the container.

19 Claims, 5 Drawing Sheets

REFRIGERATOR APPLIANCE WITH TIMED PREHEATING FOR DISPENSED FLUIDS

FIELD OF THE INVENTION

The subject matter of the present disclosure relates generally to a refrigerator appliance that dispenses hot water or heated beverages.

BACKGROUND OF THE INVENTION

Certain refrigerator appliances include a dispenser for providing water or ice. For example, ice can be provided from the refrigerator's ice maker. Water may be routed through the refrigerator compartments for cooling prior to dispensing. A user can activate the dispenser to direct a flow of ice or water into a cup positioned within the dispenser. Water directed to the dispenser is generally chilled or at an ambient temperature.

A user may also desire to have hot water or a heated beverage to be dispensed from the refrigerator. Hot water could be used, for instance, to make tea, coffee, and other beverages. Different temperature ranges may be desirable depending upon the intended use or beverage.

Refrigerator appliances are generally not connected to a residential hot water heater. Further, connecting refrigerator appliances to residential hot water heaters for purposes of dispensing can have certain drawbacks. For example, certain consumers dislike consuming heated water from residential hot water heaters because such heated water may not be filtered. Such consumers may also dislike the taste of such heated water. Furthermore, heated water from residential hot water heaters is generally heated to about one hundred and forty degrees Fahrenheit (e.g., to avoid scalding and save energy). However, certain foods and beverages may require water at a higher temperature. For example, consumers may prefer coffee or tea created with water at a higher temperature than typically provided by a residential hot water heater.

To provide hot water or a heated beverage, a refrigerator appliance can be equipped with one or more features for heating water or the beverage. In particular, a heating element can be used to provide heated water at the dispenser. However, several minutes may be required before the water heating element can heat the water to the temperature desired by the user. For some users, this waiting period may be undesirable and inconvenient. Some hot beverage dispensers, such as coffee makers, come equipped for simple timers to activate heating elements or begin a brewing process at a preset time. Nonetheless, problems may arise if a suitable container is not provided below the dispenser. For instance, dispensed liquid may spill onto the floor or surrounding environment if a user forgets to provide a container in advance of the preset time (or something happens to the container prior to the preset time).

Accordingly, a refrigerator appliance with one or more features for providing a heated fluid or liquid would be useful. Such a refrigerator appliance that can reduce or eliminate the time a user waits for the appliance to dispense the heated fluid would be particularly beneficial, especially if the appliance could control dispensing according to the presence or absence of a suitable container to receive the heated fluid.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a refrigerator appliance is provided. The refrigerator appliance may include a cabinet, a door, a dispensing assembly, a heating element, and a controller. The cabinet may define a chilled chamber. The door may be rotatably hinged to the cabinet to provide selective access to the chilled chamber. The door may define a dispenser recess to receive a container therein. The dispensing assembly may be positioned within the dispenser recess. The dispensing assembly may include an outlet conduit above the dispenser recess. The heating element may be mounted within the cabinet upstream of the outlet conduit to selectively heat a fluid to be dispensed by the outlet conduit. The controller may be in operative communication with the heating element and dispensing element. The controller may be configured to initiate a dispensing operation. The dispensing operation may include providing a first time, TIME-1, by which the fluid is to be ready at a first temperature, TEMP-1, within the cabinet; ascertaining a first time period, $\Delta t1$, required to heat the fluid to at least the first temperature, TEMP-1; initiating detection of the container within the dispenser recess prior to the first time, TIME-1; and directing the heating element prior to the first time, TIME-1, based on initiating detection of the container.

In another exemplary aspect of the present disclosure, a method of operating a refrigerator appliance is provided. The method may include providing a first time, TIME-1, by which a fluid is to be ready at a first temperature, TEMP-1. The method may also include ascertaining a first time period, $\Delta t1$, required to heat the fluid to at least the first temperature, TEMP-1. The method may further include initiating detection of a container prior to the first time, TIME-1. The method may still further include directing a heating element of the refrigerator appliance prior to the first time, TIME-1, based on initiating detection of the container.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 1:
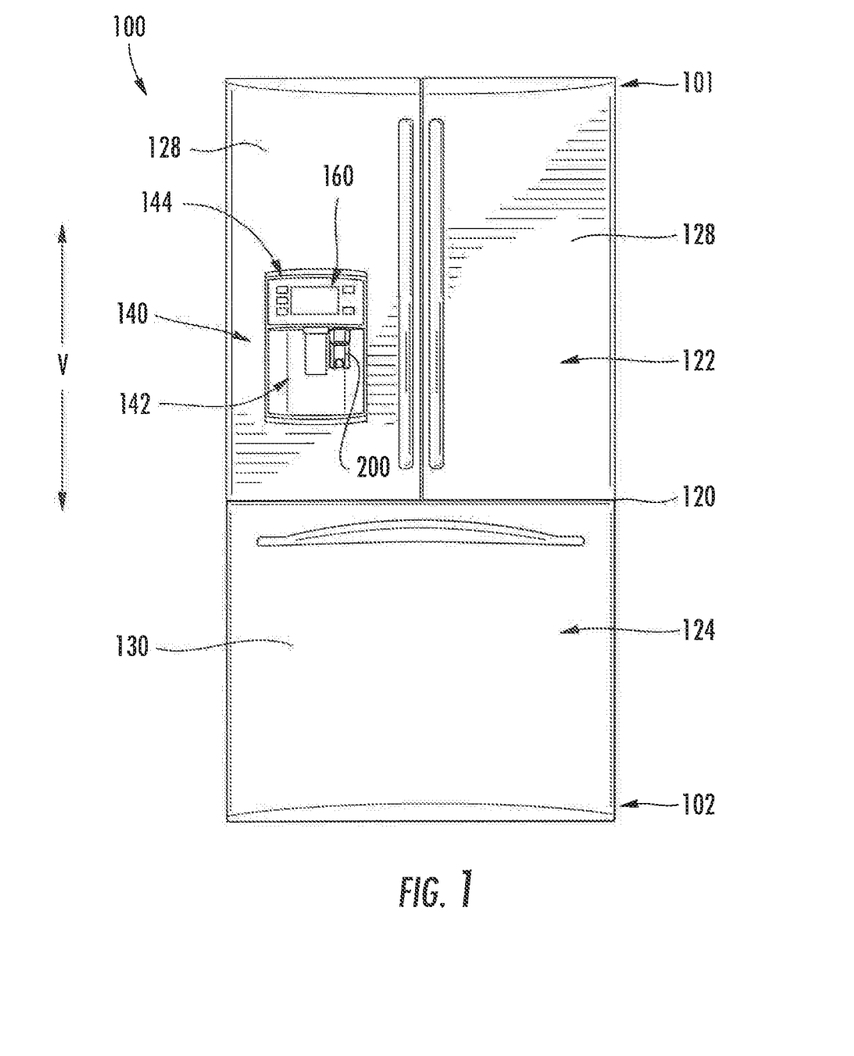
FIG. 1 provides a front, elevation view of a refrigerator appliance according to exemplary embodiments of the present disclosure.
Figure 2:
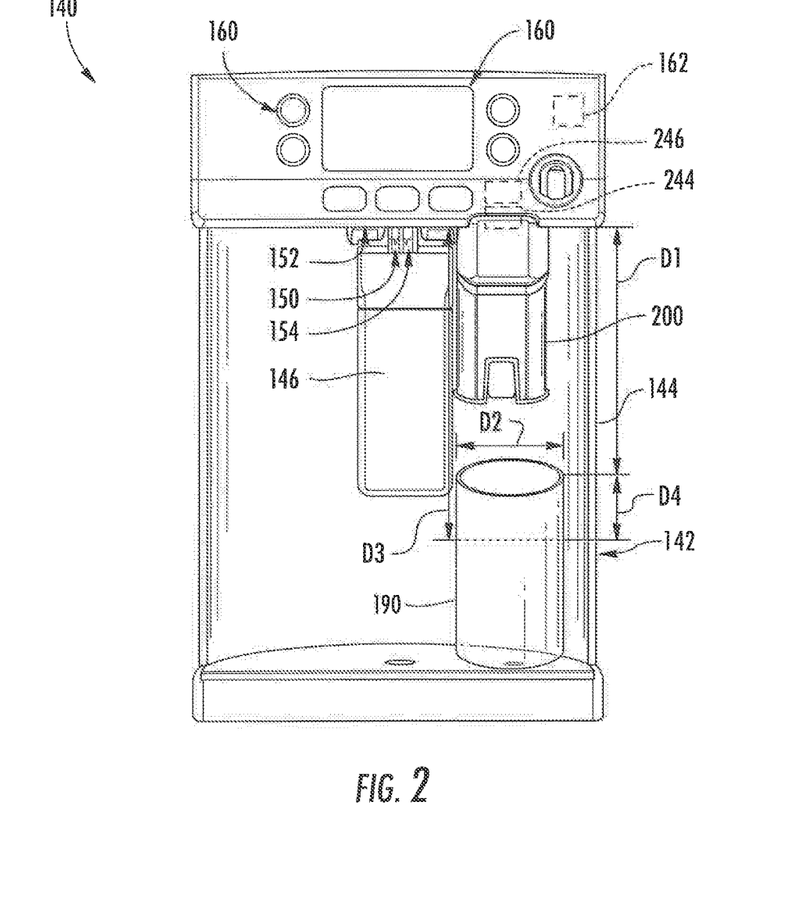
FIG. 2 provides a front, elevation view of a dispensing assembly of the exemplary refrigerator appliance of FIG. 1.

Turning now to the figures, FIG. 1 provides a front, elevation view of a refrigerator appliance 100 according to exemplary embodiments of the present disclosure. FIG. 2 provides a front, elevation view of portion of refrigerator appliance 100.

Generally, refrigerator appliance 100 includes a cabinet or housing 120. Housing 120 extends between an upper portion 101 and a lower portion 102 along a vertical direction V. Housing 120 defines chilled chambers (e.g., a fresh food compartment 122 positioned adjacent upper portion 101 of housing 120 and a freezer compartment 124 arranged at lower portion 102 of housing 120). Housing 120 also defines a mechanical compartment (not shown) for receipt of a sealed cooling system for cooling fresh food compartment 122 and freezer compartment 124.

Refrigerator appliance 100 is generally referred to as a bottom-mount refrigerator appliance. However, it should be understood that refrigerator appliance 100 is provided by way of example only. Thus, the present disclosure is not limited to refrigerator appliance 100 and may be utilized in any suitable refrigerator appliance. For example, one of skill in the art will understand that the present disclosure may be used with side-by-side style refrigerator appliances or top-mount refrigerator appliances as well.

Refrigerator doors 128 are rotatably hinged to housing 120 proximate fresh food compartment 122 in order to permit selective access to fresh food compartment 122. A freezer door 130 is arranged below refrigerator doors 128 for accessing freezer compartment 124. Freezer door 130 is mounted to a freezer drawer (not shown) slidably coupled within freezer compartment 124.

Refrigerator appliance 100 may also include a dispensing assembly 140 for dispensing various fluids, such as liquid water or ice, to a dispenser recess 142 defined on one of refrigerator doors 128. Dispensing assembly 140 includes a dispenser 144 positioned on an exterior portion of refrigerator appliance 100, for example, within dispenser recess 142. Dispenser 144 includes several outlets for accessing ice, chilled liquid water, and heated liquid water. To access ice, chilled liquid water, and heated liquid water, water-dispensing assembly 140 may for example include a paddle 146 mounted below a chilled water outlet 150, an ice outlet 152, and a heated water outlet 154.

To initiate certain exemplary operations of dispensing assembly 140, a user can urge a container (e.g., 190), such as a cup or bowl, against paddle 146 to initiate a flow of chilled liquid water, heated liquid water or ice into the container within dispenser recess 142. In particular, a control panel or user interface panel 160 may be provided for controlling the mode of operation of dispenser 144 (e.g., for selecting chilled liquid water, heated liquid water, crushed ice or whole ice). User interface panel 160 can include a chilled water dispensing button (not labeled), an ice-dispensing button (not labeled) and a heated water dispensing button (not labeled) for selecting between chilled liquid water, ice and heated liquid water, respectively. Additionally or alternatively, user interface panel 160 can include one or more inputs (e.g., buttons, switches, touch screen panels, etc.) for selecting various operations, such a preset dispensing operation (e.g., for a heated fluid or liquid). User interface panel 160 may also include a display component, such as a digital or analog display device designed to provide operational feedback to the user.

Outlets 150, 152, and 154 and paddle 146 may be an external part of dispenser 144, and are positioned at or adjacent dispenser recess 142 (e.g., a concave portion defined in an outside surface of refrigerator door 128). Dispenser 144 is positioned at a predetermined elevation convenient for a user to access ice or liquid water (e.g., enabling the user to access ice without the need to bend-over and without the need to access freezer compartment 124). In optional embodiments, dispenser 144 is positioned at a level that approximates the chest level of a user.

Operation of the refrigerator appliance 100 can be regulated by a controller 162 that is operatively coupled to user interface panel 160 or various sensors as discussed below. User interface panel 160 provides selections for user manipulation of the operation of refrigerator appliance 100 such as, for example, selections between whole or crushed ice, chilled water, or other various options, such as for a preset dispensing operation, as will be described in greater detail below. In response to user manipulation of the user interface panel 160 or sensor signals, controller 162 may operate various components of the refrigerator appliance 100. Controller 162 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 162 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 162 may be positioned in a variety of locations throughout refrigerator appliance 100. In the illustrated embodiment, controller 162 is located within the user interface panel 160. In other embodiments, the controller 162 may be positioned at any suitable location within refrigerator appliance 100, such as for example within a fresh food chamber, a freezer door, etc. Input/output ("I/O") signals may be routed between controller 162 and various operational components of refrigerator appliance 100. For example, user interface panel 160 may be in communication with controller 162 via one or more signal lines or shared communication busses.

As illustrated, controller 162 may be in communication with the various components of dispensing assembly 140 and may control operation of the various components. For example, the various valves, switches, etc. may be actuatable based on commands from the controller 162. As discussed, interface panel 160 may additionally be in communication with the controller 162. Thus, the various operations may occur based on user input or automatically through controller 162 instruction.

Refrigerator appliance 100 also includes features for generating heated liquid water and directing such heated liquid water to dispenser 144. Thus, refrigerator appliance 100 need not be connected to a residential hot water heating system in order to supply heated liquid water to dispenser 144. Dispensing assembly 140 is preferably capable of providing heated water at various temperatures depending on the type of beverage being brewed. For example, when brewing ground coffee, water for brewing may be heated to between one hundred and eighty degrees Fahrenheit and one hundred and ninety degrees Fahrenheit. Nonetheless, according to alternative embodiments, dispensing assembly 140 may be adjusted to provide water for making beverages at any suitable temperature. In some embodiments, dispensing assembly 140 includes a brew module 200 according to an exemplary embodiment of the present subject matter. Brew module 200 may be mountable within dispenser recess 142 such that brew module 200 is in fluid communication with outlet conduit 210 when mounted within dispenser recess 142. Thus, heated water from the water heating assembly may flow into brew module 200 via outlet conduit 210.

Figure 3:
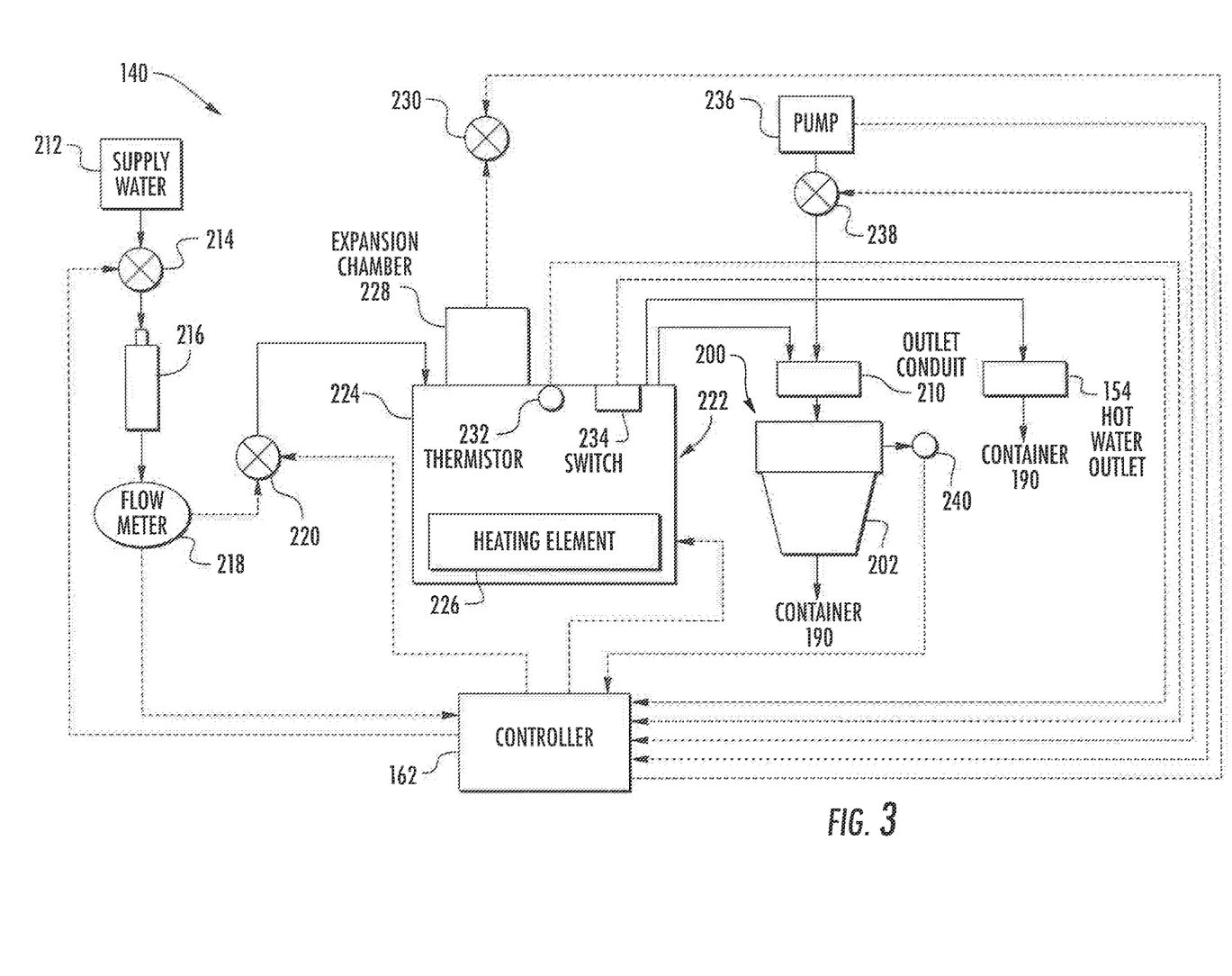
FIG. 3 provides a schematic view of a dispensing assembly according to exemplary embodiments of the present disclosure.

Turning now to FIG. 3, a schematic view of dispensing assembly 142, including exemplary features for heating a fluid or liquid (e.g., water), is provided. As discussed, dispensing assembly 140 may include an outlet conduit 210 through which liquid flows into brew pod 202. Brew pod 202 is generally a single serve vessel that contains or is Tillable with a predetermined amount of brewing contents, such as coffee, tea, hot chocolate, lemonade, or the like. The brewing contents are mixed with water to create a beverage that is dispensed to the user. According to some embodiments, brew pod 202 may also include a filter (not shown) positioned within brew pod 202 and configured for filtering brewing contents, such as coffee grounds or tea leaves. Brew pod 202 may be a single use (i.e., disposable) pod or a reusable pod. Various additional components may be provided to facilitate the flow of liquid into and through the outlet conduit 210. Such components may variously be disposed in, for example, the dispensing assembly 142, a door 128, 130, or another suitable location in the refrigerator appliance 100.

As shown, liquid (e.g., water) may be supplied from a liquid source 212 (e.g., municipal water source) through valve 214, such as an isolation valve, to a filter 216. The liquid may be filtered in the filter 216, and then flowed through a flow meter 218. One or more supply valves 220 may then control flow of the liquid to a fluid heating assembly 222. For example, when actuated to an open position, such as by controller 162, liquid may flow through supply valve 220 to fluid heating assembly 222.

Fluid heating assembly 222 may be disposed upstream of the outlet conduit 210 or hot water outlet 154. Assembly 222 may, for example, include a holding chamber 224, in which a heating element 226 (e.g., resistive heat element, gas burner, etc.) is disposed for heating liquid in the holding chamber 224. Holding chamber 224 generally holds liquid for heating and dispensing therefrom. An expansion chamber 228 may be coupled to the holding chamber 224 to, for example, allow gas generated due to fluid heating in the holding chamber 224 as well as overflow liquid to flow into the expansion chamber 228. A vent valve 230 may allow such gas to escape from the expansion chamber 228. Holding chamber 224 may additionally include, for example, a thermistor 232 and a float or level switch 234, which may govern the level and supply of liquid.

Additionally or alternatively, a gas pump 236 may be provided. Gas pump 236 may selectively flow gas through the outlet conduit 210 to a single serve brew pod 202, such as after liquid has been flowed to and through the brew pod 202, to evacuate remaining liquid from the brew pod 202. A gas valve 238 may allow such gas to be provided to the outlet conduit 210.

Liquid may thus be provided to outlet conduit 210 or hot water outlet 154 as desired via the various other components of dispensing assembly 140. Liquid may be supplied from the supply valve 220 and fluid heating assembly 222 to outlet conduit 210 and into and through single serve brew pods 202 (e.g., held within brew module 200—FIG. 2) to a user's container 190, or to hot water outlet 154 and to a user's container 190. One or more switches (e.g., 234) may be activated by controller 162 to indicate that a supply of liquid is required through outlet conduit 210 or hot water outlet 154.

As illustrated, controller 162 may be in communication with the various components of dispensing assembly 140, and may control operation of the various components. For example, the various valves, switches, etc. may be actuatable based on commands from the controller 162. As discussed, interface panel 160 may additionally be in communication with the controller 162. Thus, the various operations may occur based on user input or automatically through controller 162 instruction.

As discussed, improvements in the heating of liquids, such as water, for dispensing from a refrigerator appliance 100 are desired in the art. Accordingly, the present disclosure is further directed to methods and apparatus which advantageously facilitate such improved preheating.

Referring now generally to FIGS. 2 and 3, one or more sensors may be provided on or adjacent to dispensing assembly to aid or affect dispensing operations. In some embodiments, a module sensor 244 is provided (e.g., positioned proximate to dispenser 144). Module sensor 244 detects or is triggered when brew module 200 is positioned proximate to or on module sensor 244. Module sensor 244 may be any suitable sensor for detecting brew module 200. As an example, module sensor 244 may be a plunger switch or other suitable mechanical switch that engages brew module 200 (e.g., a surface feature on brew module 200). As another example, module sensor 244 may be a Hall effect sensor or magnetic reed switch that is triggered by a magnetic field from brew module 200 (e.g., a magnet on brew module 200). As yet another example, module sensor 244 may be a radio frequency identification (RFID) reader that reads an RFID tag on brew module 200. Module sensor 244 may be utilized to detect or determine when brew module 200 is mounted within dispenser recess 142.

In additional or alternative embodiments, a proximity sensor 246 is provided (e.g., positioned proximate to dispenser 144). Generally, proximity sensor 246 may be in operable communication with controller 162 and directed toward dispenser recess 142. For instance, proximity sensor 246 may be mounted on or above brew module 200 such that a container 190 within recess 142 is positioned below proximity sensor 246. However, it is understood that any other suitable location for proximity sensor 246 (e.g., outside or spaced apart from brew module 200) to detect a container 190 below brew module 200 may further be provided.

Generally, proximity sensor 246 may be operable to detect the presence of a presented object (e.g., container 190). Optionally, proximity sensor 246 may be operable to measure the height of the presented container 190 (e.g., the distance between proximity sensor 246 and presented container 190). In exemplary embodiments, proximity sensor 246 can be any suitable device for detecting or measuring distance to an object. For example, proximity sensor 246 may be an ultrasonic sensor, an infrared sensor, or a laser range sensor. Controller 162 can receive a signal, such as a voltage or a current, from proximity sensor 246 that corresponds to the detected presence of or distance to a presented container 190.

In some embodiments, controller 162 is configured to control or direct fluid flow (e.g., from brew module 200) based on container size (e.g., as determined from one or more signals received from proximity sensor 246). For instance, controller 162 can determine a container distance D1 for the (e.g., vertical length) between proximity sensor 246 and an uppermost portion of container 190. Controller 162 can further determine a horizontal width D2 (e.g., diameter in the lateral direction L) for the uppermost portion or lip of container 190. A liquid level D3 may further be determined for a vertical length between proximity sensor 246 and an uppermost portion of fluid within container 190. In some such embodiments, controller 162 is configured to automatically direct fluid or liquid from the outlet conduit 210 or 154 only if the horizontal width D2 is greater than a predetermined threshold width. If the horizontal width D2 is less than or equal to the predetermined threshold, controller 162 may limit or halt fluid flow to the outlet conduit 210.

Additionally or alternatively, controller 162 can be configured to fill a container 190 to a preset fluid level D3 (e.g., upon receiving a dispensing signal from user interface 160 or actuating mechanism 146). As fluid (e.g., water) is dispensed from outlet conduit 210, controller 162 may receive multiple signals from proximity sensor 246 (e.g., initiated at a predetermined interval) to track the height of fluid as it rises within container 190. Once the fluid level D3 reaches a set height D4 (e.g., measured as container distance D1 plus a predetermined height value), controller 162 may halt the flow of fluid to container 190 (e.g., by closing or halting flow through one or more valves upstream of brew pod 202).

Figure 4:
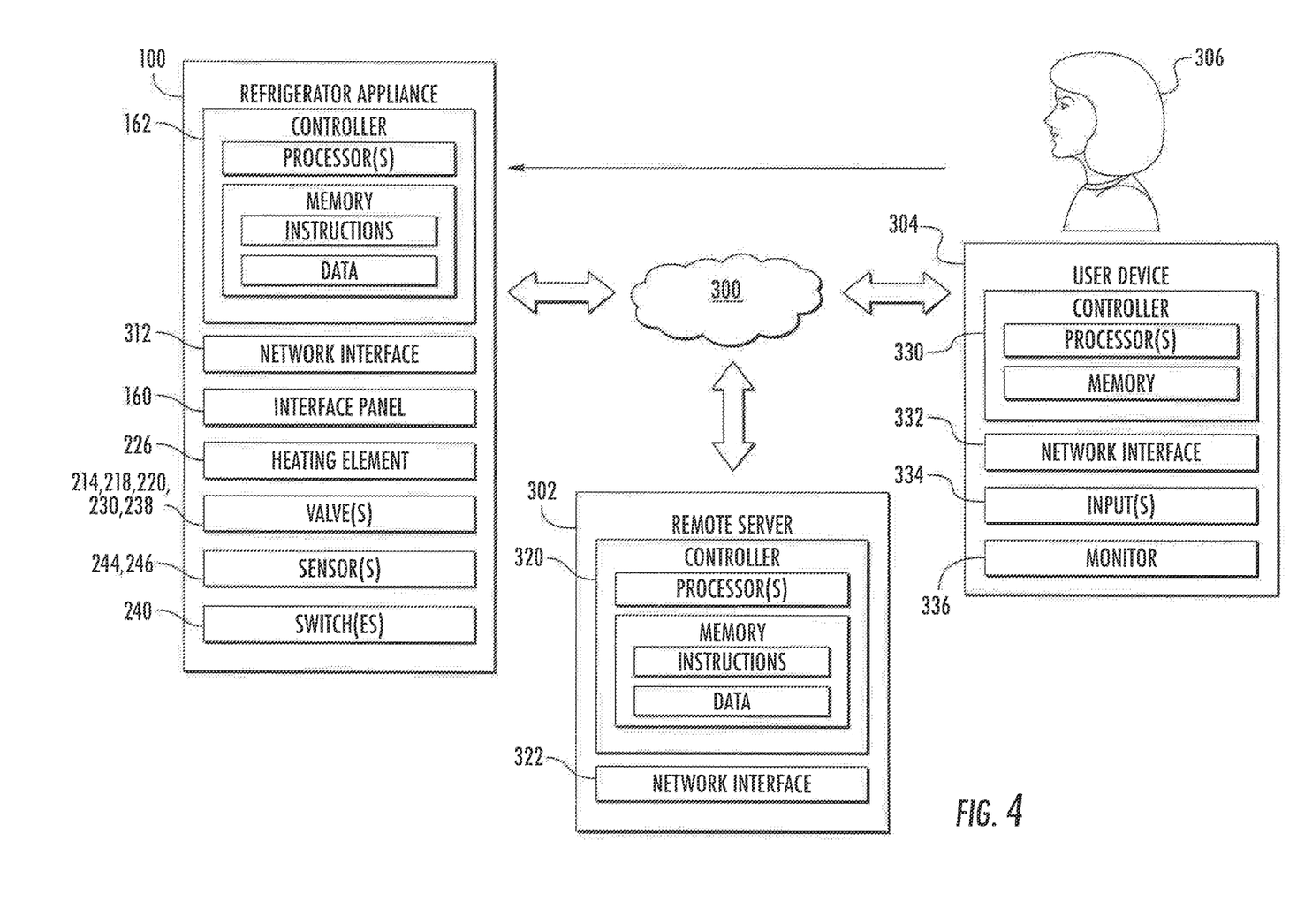
FIG. 4 provides a schematic view of an engagement system according to exemplary embodiments of the present disclosure.

Turning now to FIG. 4, in optional embodiments, refrigerator appliance 100 can be communicatively coupled (e.g., wirelessly coupled) with network 300 and various nodes, such as a remote server 302 or one or more remote user devices 304. Moreover, one or more users 306 can be in operative communication with refrigerator appliance 100 and nodes by various methods, including voice control or gesture recognition, for example. Additionally, or alternatively, although network 300 is shown, one or more portions of the system (e.g., refrigerator appliance 100, remote server 302, one or more user devices 304, or other devices within system) may be communicatively coupled without network 300; rather, refrigerator appliance 100 and various other devices of the system can be communicatively coupled via any suitable wired or wireless means not over network 300, such as, for example, via physical wires, transceiving, transmitting, or receiving components.

Network 300 can be any suitable type of network, such as a local area network (e.g., intranet), wide area network (e.g., internet), low power wireless networks [e.g., Bluetooth Low Energy (BLE)], or some combination thereof and can include any number of wired or wireless links. In general, communication over network 300 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

As noted above, refrigerator appliance 100 may include a controller 162 in communication (e.g., electrical or wireless communication) with one or more components, such as interface panel 160, heater or heating element 226, valves (e.g., 214, 218, 220, 230, or 238), sensors (e.g., 244 or 246), switches (e.g., 240), etc. In certain embodiments, controller 162 includes a network interface 312 such that refrigerator appliance 100 can connect to and communicate over one or more networks (e.g., network 300) with one or more network nodes. Network interface 312 can be an onboard component of controller 162 or it can be a separate, off board component. Controller 162 can also include one or more transmitting, receiving, or transceiving components for transmitting/receiving communications with other devices communicatively coupled with refrigerator appliance 100. Additionally or alternatively, one or more transmitting, receiving, or transceiving components can be located off board controller 162.

In some embodiments, a remote server 302, such as a web server, is in operable communication with refrigerator appliance 100 or remote user devices 304. The server 302 can be used to host an engagement platform (e.g., for facilitating data/signal exchange between refrigerator appliance 100 and a discrete user device 304). Additionally or alternatively, the server 302 can be used to host an information database. The server 302 can be implemented using any suitable computing device(s). The server 302 may include a controller 320 having one or more processors and one or more memory devices (i.e., memory). The one or more processors can be any suitable processing device (e.g., a processor core, a microprocessor, an ASIC, a FPGA, a microcontroller, etc.) and can be one processor or a plurality of processors that are operatively connected. The memory device can include one or more non-transitory computer-readable storage mediums, such as RAM, ROM, EEPROM, EPROM, flash memory devices, magnetic disks, etc., and combinations thereof. The memory devices can store data and instructions which are executed by the processor to cause remote server 302 to perform operations. For example, instructions could be instructions for receiving/transmitting recipe alert signals, transmitting/receiving status signals, transmitting/receiving instruction signals, etc.

The memory devices may also include data, such as identification data for linking a discrete refrigerator appliance 100 and user device 304 (e.g., corresponding to a particular user, instructor, or remote user device 304), that can be retrieved, manipulated, created, or stored by processor. The data can be stored in one or more databases. The one or more databases can be connected to remote server 302 by a high bandwidth LAN or WAN, or can also be connected to remote server 302 through network 300. The one or more databases can be split up so that they are located in multiple locales.

Remote server 302 includes a network interface 322 such that interactive remote server 302 can connect to and communicate over one or more networks (e.g., network 300) with one or more network nodes. Network interface 322 can be an onboard component or it can be a separate, off board component. In turn, remote server 302 can exchange data with one or more nodes over the network 300. For example, remote server 302 can exchange data with refrigerator appliance 100 and one or more remote user devices 304. Generally, it is understood that remote server 302 may further exchange data with any number of client devices or nodes over the network 300. The client devices can be any suitable type of computing device, such as a general-purpose computer, special purpose computer, laptop, desktop, integrated circuit, mobile device, smartphone, tablet, or other suitable computing device.

In certain embodiments, a user device 304 is communicatively coupled with network 300 such that user devices 304 can communicate with refrigerator appliance 100. User devices 304 can communicate directly with refrigerator appliance 100 via network 300. Alternatively, user devices 304 can communicate indirectly with refrigerator appliance 100 by communicating via network 300 with remote server 302, which in turn communicates with refrigerator appliance 100 via network 300. Moreover, user 306 can be in operative communication with user devices 304 such that user 306 can communicate with refrigerator appliance 100 via user devices 304.

User device 304 can be any type of device, such as, for example, a personal computing device (e.g., laptop or desktop), a mobile computing device (e.g., smartphone or tablet), a gaming console or controller, a wearable computing device, an embedded computing device, a remote, or any other suitable type of user computing device. User device 304 can include one or more user device controllers 330. Controller 330 can include one or more processors and one or more memory devices. The one or more processors can be any suitable processing device (e.g., a processor core, a microprocessor, an ASIC, a FPGA, a controller, a microcontroller, etc.) and can be one processor or a plurality of processors that are operatively connected. The memory device (i.e., memory) can include one or more non-transitory computer-readable storage mediums, such as RAM, ROM, EEPROM, EPROM, flash memory devices, magnetic disks, etc., and combinations thereof. The memory can store data and instructions which are executed by the processor to cause user device 304 to perform operations. Controller 330 may include a user device network interface 332 such that user device 304 can connect to and communicate over one or more networks (e.g., network 300) with one or more network nodes. Network interface 332 can be an onboard component of controller 330 or it can be a separate, off board component. Controller 330 can also include one or more transmitting, receiving, or transceiving components for transmitting/receiving communications with other devices communicatively coupled with user device 304. Additionally or alternatively, one or more transmitting, receiving, or transceiving components can be located off board controller 330.

User device 304 can include one or more user inputs 334 (e.g., buttons, knobs, one or more cameras, etc.) or a monitor 336 configured to display graphical user interfaces or other visual representations to user. For example, monitor 336 can display graphical user interfaces corresponding to operational features of refrigerator appliance 100 such that user may manipulate or select the features to operate refrigerator appliance 100. Monitor 336 can be a touch sensitive component (e.g., a touch-sensitive display screen or a touch pad) that is sensitive to the touch of a user input object (e.g., a finger or a stylus). For example, a user 306 may touch the monitor 336 with his or her finger and type in a series of numbers on the monitor 336. In addition, motion of the user input object relative to the monitor 336 can enable user 306 to provide input to user device 304. User device 304 may provide other suitable methods for providing input to user device 304 as well. Moreover, user device 304 can include one or more speakers, one or more cameras, or more than one microphones such that user device 304 is configured with voice control, motion detection, and other functionality.

As noted above, user device 304 may communicate with instructor device (e.g., directly or indirectly). In turn, controller 330 of user device 304 may exchange signals with refrigerator appliance 100. In some embodiments, one or more portions of user device 304 can be controlled according to signals received from controller 162 of refrigerator appliance 100. For instance, the monitor 336 may project or display a stored visual alert in response to an alert signal received from controller 162. Additionally or alternatively, user device 304 may provide a graphical user interface for selecting or setting a time at which a hot beverage or liquid is desired from dispensing assembly 140 (FIG. 2). Such selections or settings may be communicated to refrigerator appliance 100 (e.g., via network 300 as one or more beverage-request signals).

Figure 5:
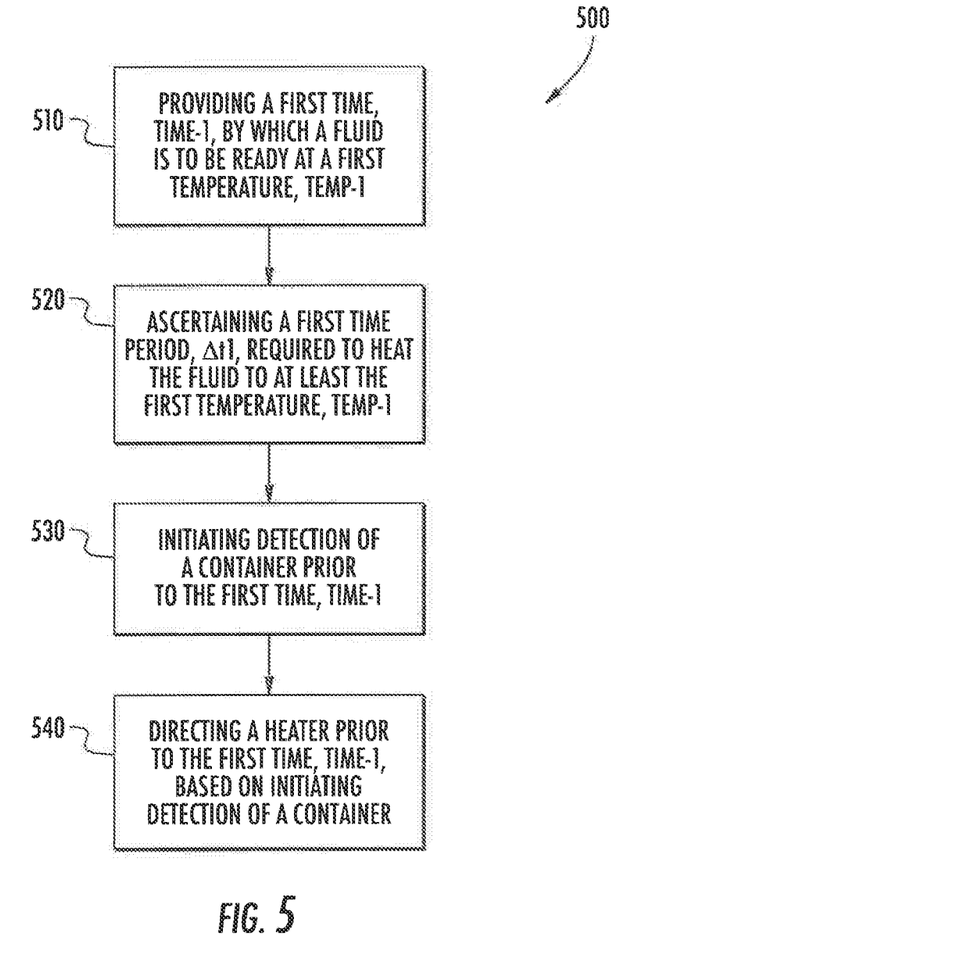
FIG. 5 provides a flow chart illustrating a method of operating a refrigerator appliance according to exemplary embodiments of the present disclosure.

Referring now to FIG. 5, various methods (e.g., method 500) may be provided for use with refrigerator appliance 100 according to exemplary embodiments of the present disclosure. In general, the various steps of methods as disclosed herein may be performed by controller 162 as part of an operation (e.g., programmed dispensing operation) that controller 162 is configured to initiate. During such methods, controller 162 may receive input signals and transmit output signals from various components of refrigerator appliance 100 [e.g., user interface 160, one or more valves (e.g., 214, 218, 220, 230, or 238), sensors (e.g., 244 or 246), switches (e.g., 240), etc.]. Additionally or alternatively, controller 162 may receive input signals and transmit output signals from various remote devices (e.g., remote server 302 or one or more user devices 304), as described above. In particular, the present disclosure is further directed to methods, as indicated by 500, for operating refrigerator appliance 100.

Advantageously, the methods described by the current disclosure may provide for safely dispensing a heating liquid at a predetermined or preset time. Moreover, the described methods may ensure dispensed liquid is directed to a container 190 and prevent the liquid from inadvertently spilling or dispensing to the surrounding environment.

FIG. 5 depicts steps performed in a particular order for purpose of illustration and discussion. Those of ordinary skill in the art, using the disclosures provided herein, will understand that (except as otherwise explicitly or implicitly indicated) the steps of any of the methods disclosed herein can be modified, adapted, rearranged, omitted, or expanded in various ways without deviating from the scope of the present disclosure.

As shown, at 510, the method 500 includes providing a first time, TIME-1, by which a fluid is to be ready at a first temperature, TEMP-1. The fluid may include a liquid (e.g., water) such as would be desired as part of a hot beverage (e.g., coffee, tea, etc.) or in isolation. Optionally, the temperature TEMP-1 may correspond to a selection made at the user interface. For instance, the temperature TEMP-1 may be predetermined or programmed within the refrigerator appliance controller (e.g., as corresponding to a discrete beverage that is selectable by a user) or, alternatively, may be selected specifically by a user. In some embodiments, the temperature TEMP-1, is a discrete temperature between one hundred and forty degrees Fahrenheit and one hundred and ninety degrees Fahrenheit.

In some embodiments, user selects the time TIME-1 at which the fluid should be ready for dispensing at temperature TEMP-1. For example, the user might select 7:00 AM or some other time as a time at which fluid should be available at a temperature TEMP-1.

At 520, the method 500 includes ascertaining or determining a first time period, $\Delta t1$, required to heat the fluid to at least the first temperature, TEMP-1. In particular, the first time period $\Delta t1$, corresponds to a predetermined volume of the fluid (e.g., less than or equal to a set maximum container volume). For example, the controller of the refrigerator appliance may determine that a $\Delta t1$ of 20 minutes is required to heat a predetermined volume to the temperature of TEMP-1. As will be understood by one of skill in the art using the teachings disclosed herein, a variety of techniques could be used for such determination. For example, the controller of the refrigerator appliance could receive temperature measurements from one or more temperature sensors to indicate the current temperature of the fluid upstream from the dispenser or brew module. Using this information and the predetermined volume, the controller of the refrigerator appliance could be programmed with an algorithm or empirical data that allows a prediction of $\Delta t1$.

At 530, the method 500 includes initiating detection of a container prior to the time TIME-1. In some embodiments, 530 occurs prior to the first time period, $\Delta t1$. In other words, 530 may occur at a time before TIME-1 minus $\Delta t1$. For example, if TIME-1 is 7:00 AM and $\Delta t1$ is 20 minutes, 530 may occur at a time before 6:40 AM.

In some embodiments, the container is detected by a suitable sensor, such as a proximity sensor, as described above. For instance, a detection signal may be transmitted to the proximity sensor to initiate a detection-gathering sequence. In response to the detection signal, the controller of the refrigerator appliance may receive a response signal (e.g., container-present signal or container-absent signal) corresponding to whether the container is present. Nonetheless, as would be understood, detection of the container may include any other suitable steps for recognizing the presence of a (e.g., via receipt of a weight signal from a scale mounted within a base portion of the dispensing assembly).

If a container is present, a container-present signal may be received. For instance, the response signal received from the proximity sensor may correspond to conditions that have been determined (e.g., via an algorithm or empirical data) to indicate the presence of a container within the dispensing assembly (e.g., below the dispenser). Thus, the controller may determine that the container is present within the dispensing assembly from the received response signal.

If a container is not present, a container-absent signal may be received. For instance, the response signal received from the proximity sensor may correspond to conditions that have been determined (e.g., via an algorithm or empirical data) to indicate that no container is present within the dispensing assembly (e.g., below the dispenser). Thus, the controller may determine that the container is not present within the dispensing assembly from the received response signal.

If a specific beverage (e.g., coffee or tea) is selected, the method 500 may include receiving a single serve dispenser (e.g., upstream from the container) prior to TIME-1. Optionally, the method 500 may include confirming receipt of the single serve dispenser within the dispensing assembly (e.g., presence of the brew module) prior to TIME-1. For instance, confirming receipt may occur prior to or in tandem with 530.

At 540, the method 500 includes directing a heating element of the refrigerator appliance based on initiating detection of a container at 530. Specifically, the directing at 540 occurs prior to TIME-1 and subsequent to 530. In some embodiments, 540 occurs prior to $\Delta t1$. In other words, 540 may occur at a time before TIME-1 minus $\Delta t1$. For example, if TIME-1 is 7:00 AM and $\Delta t1$ is 20 minutes, 540 may occur at a time before 6:40 AM.

In certain embodiments, whether the heating element is activated may depend on whether a container-present signal is received or a container-absent signal is received.

As an example, in response to receiving a container-absent signal, 540 may include restricting activation of the heating element. In some such embodiments, the heating element remains inactive or off such that water is not actively heated by the heating element. Additionally or alternatively, an alert signal may be transmitted (e.g., to a remote user device) to initiate an alert or alarm that no container is present within the dispensing assembly. Thus, a user may be informed of the status of the refrigerator appliance and, for example, that fluid will not be dispensed as scheduled.

As another example, in response to receiving a container-present signal, 540 may include activating the heating element. In other words, the heating element may actively heat a volume of liquid or water within the refrigerator appliance. For instance, the predetermined volume may be heated to the temperature TEMP-1.

Subsequent to receiving a container-present signal, the method 500 may include dispensing the fluid to the container. In some embodiments, the fluid may be dispensed at TIME-1 based on receiving the container-present signal (e.g., once the temperature TEMP-1 has been reached).

Optionally, the dispensing may be solely contingent on receipt of a single container-present signal. For instance, the predetermined volume may be dispensed to the container (e.g., through the dispenser) upon reaching the temperature TEMP-1 if the container-present signal is received.

Alternatively, the dispensing may require or be influenced by subsequent signals (e.g., received from the proximity sensor).

As an example, the volume or level of fluid dispensed may be based on level-detection signals received while the fluid is being dispensed. Specifically, the controller may stop dispensing once a predetermined level is reached within the container. The method 500 may thus include initiating a plurality of level-detection signals (e.g., at the proximity sensor) in response to dispensing the fluid to the container, determining a height of the fluid within the container based on the level detection signals, comparing the height to a predetermined level, and halting dispensing in response to the height being greater than or equal to the predetermined level.

As another example, the container's presence may be confirmed after the heating element has been activated, but prior to the dispensing (e.g., prior to the TIME-1). The confirmation may require a secondary detection of the container. For instance, the method 500 may include initiating secondary detection prior to the time TIME-1 and subsequent to receiving the first container-present signal at 540. In some such embodiments, the secondary detection is similar to or mirrors (e.g., repeats) 530. In response to initiating the secondary detection, a second container-present signal may be received. Dispensing the fluid to the container may be contingent on receiving the second container-present signal. Thus, the dispensing assembly may prevent dispensing if the second container-present signal is not received.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance defining a vertical direction, a lateral direction, and a transverse direction, the refrigerator appliance comprising:
   a cabinet defining a chilled chamber;
   a door being rotatably hinged to the cabinet to provide selective access to the chilled chamber, the door defining a dispenser recess to receive a container therein;
   a dispensing assembly positioned within the dispenser recess, the dispensing assembly comprising an outlet conduit above the dispenser recess;
   a heating element mounted within the cabinet upstream of the outlet conduit to selectively heat a fluid to be dispensed by the outlet conduit;
   a proximity sensor directed at the dispenser recess; and
   a controller in operative communication with the heating element, the proximity sensor and the dispensing assembly, the controller being configured to initiate a dispensing operation, the dispensing operation comprising
      providing a first time, TIME-1, by which the fluid is to be ready at a first temperature, TEMP-1, within the cabinet,
      ascertaining a first time period, Δt1, required to heat the fluid to at least the first temperature, TEMP-1,
      initiating detection of the container within the dispenser recess prior to the first time, TIME-1,
      receiving a container-present signal from the proximity sensor in response to initiating detection of the container, and
      directing the heating element prior to the first time, TIME-1, in response to receiving the container-present signal.

2. The refrigerator appliance of claim 1, wherein the dispensing operation further comprises dispensing the fluid to the container at the first time, TIME-1.

3. The refrigerator appliance of claim 1, wherein the dispensing operation further comprises receiving a single serve brew pod within the dispensing assembly upstream from the container prior to the first time.

4. The refrigerator appliance of claim 1, wherein the dispensing operation further comprises dispensing the fluid to the container at the first time, TIME-1.

5. The refrigerator appliance of claim 4, wherein the dispensing operation further comprises
   initiating a plurality of level-detection signals in response to dispensing the fluid to the container,
   determining a height of the fluid within the container based on the level detection signals,
   comparing the height to a predetermined level, and
   halting dispensing in response to the height being greater than or equal to the predetermined level.

6. The refrigerator appliance of claim 4, wherein the container-present signal is a first container-present signal, wherein the dispensing operation further comprises
   initiating secondary detection prior to the first time, TIME-1, and subsequent to receiving the first container-present signal, and
   receiving a second container-present signal in response to initiating secondary detection of the container, and wherein dispensing the fluid to the container is contingent on receiving the second container-present signal.

7. The refrigerator appliance of claim 1, wherein the dispensing operation further comprises receiving a container-absent signal in response to initiating detection of the container prior to receiving the container-present signal, and wherein directing the heating element comprises restricting activation of the heating element in response to receiving the container-absent signal.

8. The refrigerator appliance of claim 7, wherein the dispensing operation further comprises transmitting an alert signal in response to receiving the container-absent signal.

9. A method of operating a refrigerator appliance having a hot fluid dispensing assembly, the method comprising the steps of:
   providing a first time, TIME-1, by which a fluid is to be ready at a first temperature, TEMP-1;
   ascertaining a first time period, Δt1, required to heat the fluid to at least the first temperature, TEMP-1;
   initiating detection of a container prior to the first time, TIME-1;
   receiving a container-present signal from a proximity sensor directed at a dispenser recess and in response to initiating detection of the container; and
   directing a heating element of the refrigerator appliance prior to the first time, TIME-1, in response to receiving the container-present signal.

10. The method of claim 9, further comprising:
    dispensing the fluid to the container at the first time, TIME-1.

11. The method of claim 9, further comprising:
    receiving a single serve brew pod upstream from the container prior to the first time.

12. The method of claim 9, further comprising:
    dispensing the fluid to the container at the first time, TIME-1.

13. The method of claim 12, further comprising:
    initiating a plurality of level-detection signals in response to dispensing the fluid to the container;
    determining a height of the fluid within the container based on the level detection signals;
    comparing the height to a predetermined level; and
    halting dispensing in response to the height being greater than or equal to the predetermined level.

14. The method of claim 12, wherein the container-present signal is a first container-present signal, wherein the method further comprises:
    initiating secondary detection prior to the first time, TIME-1, and subsequent to receiving the first container-present signal; and
    receiving a second container-present signal in response to initiating secondary detection of the container, wherein dispensing the fluid to the container is contingent on receiving the second container-present signal.

15. The method of claim 9, further comprising:
    receiving a container-absent signal in response to initiating detection of the container prior to receiving the container-present signal, wherein directing the heating element comprises restricting activation of the heating element in response to receiving the container-absent signal.

16. The method of claim 15, further comprising:
transmitting an alert signal in response to receiving the container-absent signal.

17. A refrigerator appliance defining a vertical direction, a lateral direction, and a transverse direction, the refrigerator appliance comprising:
a cabinet defining a chilled chamber;
a door being rotatably hinged to the cabinet to provide selective access to the chilled chamber, the door defining a dispenser recess to receive a container therein;
a dispensing assembly positioned within the dispenser recess, the dispensing assembly comprising an outlet conduit above the dispenser recess;
a heating element mounted within the cabinet upstream of the outlet conduit to selectively heat a fluid to be dispensed by the outlet conduit;
a proximity sensor directed at the dispenser recess, the proximity sensor comprising an ultrasonic sensor, an infrared sensor, or a laser range sensor; and
a controller in operative communication with the heating element, the proximity sensor and the dispensing assembly, the controller being configured to initiate a dispensing operation, the dispensing operation comprising
providing a first time, TIME-1, by which the fluid is to be ready at a first temperature, TEMP-1, within the cabinet,
ascertaining a first time period, $\Delta t1$, required to heat the fluid to at least the first temperature, TEMP-1,
initiating detection of the container within the dispenser recess prior to the first time, TIME-1,
receiving a first container-present signal from the proximity sensor in response to initiating detection of the container,
directing the heating element prior to the first time, TIME-1, in response to receiving the first container-present signal,
initiating secondary detection prior to the first time, TIME-1, and subsequent to receiving the first container-present signal,
receiving a second container-present signal in response to initiating secondary detection of the container, and
dispensing the fluid to the container at the first time, TIME-1, in response to receiving the second container-present signal.

18. The refrigerator appliance of claim 17, wherein the dispensing operation further comprises
receiving a container-absent signal in response to initiating detection of the container prior to receiving the container-present signal, wherein directing the heating element comprises restricting activation of the heating element in response to receiving the container-absent signal.

19. The refrigerator appliance of claim 18, wherein the dispensing operation further comprises
transmitting an alert signal in response to receiving the container-absent signal.

* * * * *